United States Patent [19]

Lynch

[11] 3,977,993
[45] Aug. 31, 1976

[54] METAL OXIDE AEROGELS

[75] Inventor: Thomas J. Lynch, Oakmont, Pa.

[73] Assignee: Gulf Research & Development Company, Pittsburgh, Pa.

[22] Filed: Mar. 12, 1975

[21] Appl. No.: 557,465

[52] U.S. Cl. .............................. 252/317; 252/315; 252/451; 423/338
[51] Int. Cl.² ...................................... B01J 13/00
[58] Field of Search .................. 252/315, 317, 451; 423/338

[56] References Cited
UNITED STATES PATENTS

| | | | |
|---|---|---|---|
| 2,249,767 | 7/1941 | Kistler | 252/315 X |
| 3,652,216 | 3/1972 | Krekeler | 252/451 X |
| 3,672,833 | 6/1972 | Teichner et al. | 252/315 X |
| 3,801,705 | 4/1974 | Krekeler et al. | 423/338 |
| 3,819,811 | 6/1974 | Aboutboul et al. | 423/338 |

Primary Examiner—Benjamin R. Padgett
Assistant Examiner—E. Suzanne Parr
Attorney, Agent, or Firm—Richard L. Kelly

[57] ABSTRACT

Novel metal oxide aerogels, particularly silica aerogels, having a combination of both a large surface area and a large pore volume are provided. Such aerogels have a surface area of at least 300 square meters per gram and a pore volume of at least 2 milliliters per gram, said values being determined by isothermal liquid nitrogen desorption. The aerogels are prepared by a modification of the method disclosed by Kistler in U.S. Pat. No. 2,249,767.

3 Claims, 3 Drawing Figures

METAL OXIDE AEROGELS

BACKGROUND OF THE INVENTION

Metal oxide gels, such as silica gels, can be prepared in separate and distinct forms. The more common form is the hydrogel in which the voids in the metal oxide structure are filled with water. The other form is characterized as an aerogel. Aerogels are prepared from hydrogels by special techniques in which the water originally present in a hydrogel is displaced by a gas, usually air.

The best known method for preparing aerogels is that disclosed by Kistler in U.S. Pat. No. 2,249,767. Such aerogels have very low bulk densities and are useful for many industrial purposes.

SUMMARY OF THE INVENTION

The applicant has discovered that metal oxide aerogels, particularly silica aerogels, having unusual and highly desirable combinations of properties can be prepared by a modification of the Kistler process. The metal oxide aerogels of the invention, as compared with metal oxide aerogels prepared by the Kistler process, have a significantly lower bulk density and superior surface characteristics. With respect to surface characteristics, the metal oxide aerogels of the invention have a highly desirable combination of both a large surface area and a large average pore volume.

DETAILED DESCRIPTION OF THE INVENTION

Figure 1:
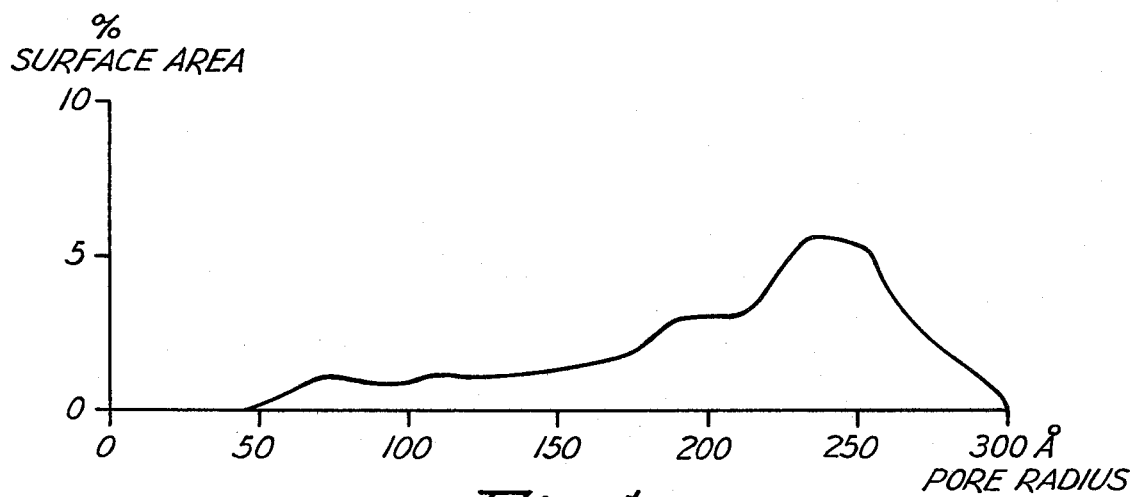
FIG. 1 of the drawings is a plot of % Surface Area vs. Pore Radius of a silica aerogel prepared in accordance with the present invention.

As noted above, the present invention is based upon the applicant's discovery of metal oxide aerogels having physical properties distinctly different from and distinctly superior to metal oxide aerogels heretofore available to the art. Specifically, the applicant has provided metal oxide aerogels having bulk densities as low as 0.05 gram per milliliter. By contrast, metal oxide aerogels prepared by the best techniques reported in the prior art have bulk densities of at least 0.2 gram per milliliter. The metal oxide aerogels of the invention have desirable surface properties in that they have a combination of both a large surface area and a large average pore size. The metal oxide aerogels of the invention have a surface area of at least about 200 and frequently 375 or more square meters per gram and an average pore volume of 2 and frequently 3 or more milliliters per gram, such values being determined by isothermal liquid nitrogen desorption. By contrast, metal oxide aerogels prepared by the best techniques reported in the prior art have a relatively low average pore volume, usually less than 1 milliliter per gram.

The metal oxide aerogels of the invention are prepared by a modification of the process disclosed by Samuel S. Kistler in U.S. Pat. No. 2,249,767. Certain aspects of the Kistler process and the properties of the metal oxide aerogels produced thereby are set forth in *J. Phys. Chem.* 36, 52 (1932) and *J. Am. Chem. Soc.* 65, 1909 (1943).

The Kistler process for producing metal oxide aerogels involves a series of steps in which a metal oxide hydrogel is prepared, as by acidification of water glass. The hydrogel as thus prepared consists of a slurry of the hydrogel in an aqueous medium. The hydrogel then is filtered free of the aqueous medium in which it is prepared and is washed with a solvent such as ethanol to free the hydrogel of water. The hydrogel, and the solvent in which it is then suspended, are transferred to a pressure-resistant vessel and heated to above the critical point of the organic solvent. After the temperature and pressure within the pressure-resistant vessel exceed the critical point, the solvent vapor is vented from the pressure-resistant vessel.

The resulting metal oxide product is now referred to as a metal oxide aerogel and has a very fine particle size and a very low bulk density. Such aerogels have relatively high surface areas, but relatively low pore volumes. It has been generally believed that the aerogels retain the gel structure of the hydrogels with the liquid originally present in the gel having been displaced with air. By transmission electron microscopy data subsequently discussed in this application, the applicant has established that the pore structure of such hydrogels and aerogels are quite different from one another.

Metal oxide aerogels, prepared as described above, by reason of their very small particle size and very low bulk densities, have many properties which differ significantly from metal oxide hydrogels. In other respects, however, the properties of metal oxide aerogels do not differ significantly from the corresponding properties of metal oxide hydrogels. By way of specific example, silica hydrogels are used as supports for chromium catalysts used in the polymerization of ethylene. Silica aerogels produced by the Kistler process show no observable difference in performance when used as a chromium catalyst support. The applicant has discovered that polymerization catalysts having significantly different and significantly improved properties can be prepared when a chromium catalyst is supported on a silica aerogel prepared by a modified Kistler process, such silica aerogel having a surface area and pore volume within the range previously set forth. Such polymerization catalysts are disclosed and claimed in the applicant's copending application Ser. No. 557,498, filed of even date herewith.

The modified Kistler process employed to produce the metal oxide aerogels of the present invention consists of the following steps:

1. First, a metal oxide hydrogel is prepared by conventional techniques as by acidification of water glass with a mineral acid such as sulfuric acid.

2. Optionally, the hydrogel from step (1) is washed substantially free of alkali metal ions. This may be accomplished by filtering the hydrogel from the aqueous medium in which it is prepared and then washing the silica hydrogel with several aliquots of a dilute solution of either nitric acid or an ammonium salt such as ammonium nitrate.

3. The hydrogel then is freed of water by being placed in contact with a suitable organic solvent such as ethanol. The contacting is continued until substantially all of the water in the silica hydrogel is displaced with the organic solvent.

4. After the bulk of the water has been removed from the hydrogel*, the organic solvent in contact with the hydrogel then is treated to render it rigorously anhydrous and so that, in the final step of the treatment, after the system has reached equilibrium, the organic solvent contains less than 200 ppm of water.

* In strict terms, a hydrogel is a gel containing water. At this stage of the process, the water has been displaced with the organic solvent. Solely for convenience of description, the term hydrogel will be used to describe all gels containing a liquid therein. The term aerogel will be used when the liquid originally in the gel has been displaced with a gas, usually air.

5. The organic solvent hydrogel mixture from step (4) then is transferred to a pressure-resistant vessel, and the organic solvent is removed therefrom by heating the mixture to above the critical point and releasing the organic solvent therefrom at a pressure at least equal to the critical pressure of the organic solvent.

6. After the organic solvent has been completely removed from the hydrogel, the resulting aerogel is brought back to ambient temperature and pressure under rigorously anhydrous conditions.

7. For certain end use applications, the aerogel from step (6) is calcined at an elevated temperature in a rigorously anhydrous environment.

Essentially any type of metal oxide hydrogel can be employed in the process. The metal oxide hydrogels of such metal as silicon, titanium, boron, vanadium, chromium, tungsten, molybdenum, aluminum, iron, and mixtures thereof are preferred. Techniques for the manufacture of such hydrogels (including metal oxide cogels) are well known in the art. See, for example, the Kistler publications referred to earlier herein.

After the hydrogel has been prepared, it is preferred practice to wash the hydrogel free of alkali metal ions. Techniques for washing the hydrogel free of alkali metal ions are well known in the art. The reason for carrying out this step is to prevent sintering of the ultimate aerogel — with a resulting loss of pore volume — if the aerogel is heated to temperatures of the order of 1400°F. (770°C.) or higher. The step of washing the hydrogel free of alkali metal ions can be eliminated if the aerogel will not be subjected to such elevated temperatures.

In the third step of the process, the water present in the initially-prepared hydrogel is replaced with an organic solvent. Techniques for replacing the water content of a hydrogel with an organic solvent are reported in the literature, e.g., see Kistler, *J. Phys. Chem.*, 36, 52 (1932). Mechanistically, all that is required is that the hydrogel be filtered free of the aqueous medium in which it is prepared and contacted with successive aliquots of an appropriate organic solvent until all of the water has been extracted from the hydrogel.

The organic solvent employed to replace the water of the hydrogel should be selected on a basis of two criteria. First, the organic solvent should dissolve at least 10 weight % water and preferably should be completely miscible with water. Second, the organic solvent should have a relatively low critical point, i.e., a critical pressure not higher than about 100 atmospheres and preferably not higher than 65 atmospheres, and a critical temperature not higher than about 300°C. and preferably not higher than 250°C. Any organic solvent meeting these criteria may be employed. Suitable organic solvents include, inter alia, low boiling alcohols, such as methanol and ethanol, low boiling esters such as ethyl acetate, tetrahydrofuran, and others.

After the bulk of the water has been removed from the hydrogel with the organic solvent, it is necessary to treat the organic solvent so that it is rigorously dried and so that the water content of the organic solvent in final equilibrium with the hydrogel is reduced to a level 200 parts per million or less, preferably to less than 150 parts per million. This step may be carried out conveniently by continuously withdrawing a portion of the organic solvent from contact with the hydrogel, passing such solvent through a drying column packed with molecular sieves, and returning the rigorously dried organic solvent to again contact the hydrogel.

The slurry of hydrogel and rigorously dried organic solvent then is transferred to a suitable apparatus for removal of the organic solvent therefrom by venting the organic solvent from the apparatus at a temperature and pressure above the critical point of the organic solvent. Techniques for carrying out this procedure are known and reported in the literature.

After the organic solvent has been removed, rigorously anhydrous air is admitted to the apparatus to facilitate removal of the aerogel. The air admitted to the apparatus should be dried to a dew point of less than about −60°C.

The recovered aerogel, after preparation, should be stored under anhydrous conditions to prevent adsorption of moisture from the air.

If the aerogel is calcined, it should be calcined at a temperature of at least about 400°C. and preferably at least 500°C. in a stream of oxygen-containing gas having a dew point of less than about −50°C. and preferably less than −60°C.

For reasons not fully understood, the pore structure of the metal oxide aerogels prepared by the above-described process differs significantly from the pore structure of metal oxide aerogels prepared by the known Kistler process. Specifically, silica aerogels prepared by the described process have both a large surface area and a large pore volume within the range previously described, whereas, silica aerogels prepared by the Kistler process have a relatively small pore volume, usually less than 1.0 milliliter per gram. In addition, metal oxide aerogels prepared by the above-described process have a bulk density of about 0.05 gram per milliliter, whereas corresponding metal oxide aerogels made by the Kistler process have a bulk density of about 0.2 gram per milliliter.

The following examples are set forth to illustrate more clearly the principle and practice of this invention to those skilled in the art. All parts and percentages set forth in the examples are parts and percentages by weight.

EXAMPLE 1

A stirred reactor was charged with 150 parts of water glass (N-grade manufactured by Philadelphia Quartz Company) and 570 parts of distilled water. The resulting mixture was cooled to approximately 2°C. and a 13% sulfuric acid solution was added to the stirred mixture at a rate of about 1.5 parts per minute until the pH of the mixture reached 6.5. Thereafter, the reaction mixture was heated to a temperature of approximately 95°C. and was stirred for 3 hours. The pH of the system was measured periodically, and, as required, small quantities of a 13% sulfuric acid solution were added to maintain the pH of the system at 6.5. The product was a silica hydrogel suspended in water.

The silica hydrogel prepared in the paragraph above was filtered free of the aqueous medium in which it was prepared and then was slurried in a 1% solution of ammonium nitrate for 15 minutes. This slurry was allowed to stand for approximately 1 hour so that the gel settled and the supernatent liquid was withdrawn and discarded. This procedure was repeated several times until the supernatent liquid gave a negative test for sulfate ion with a 1% barium chloride solution. This treatment freed the silica hydrogel of sodium ions.

The supernatent water of the slurry from the paragraph above was withdrawn from the reactor and replaced with absolute ethanol. The silica hydrogel was slurried with the ethanol for about 15 minutes, was allowed to stand for approximately 20 minutes, and the supernatent ethanol was withdrawn and discarded. This procedure was repeated four times to displace the water in the silica hydrogel with ethanol. The supernatent ethanol, after the last treatment, contained approximately 30,000 ppm of water.

The silica hydrogel from the paragraph above was transferred to a reaction vessel fitted with a bottom exit port, a porous glass frit sealing plate fitted just above the bottom exit port and a side exit port positioned just above the porous glass frit sealing plate. The vessel also was equipped with a stirrer and a liquid entry port at the top. The vessel then was charged with ethanol that had been rendered rigorously anhydrous (less than 100 ppm water) by passage through a drying column packed with Type 3-A molecular sieves. The silica hydrogel-ethanol slurry was gently stirred and ethanol was continuously withdrawn from the bottom exit port at the same time that additional rigorously anhydrous ethanol was charged to the vessel. This treatment was continued until the water content of the ethanol being withdrawn from the vessel had been reduced to 150 ppm. At this point, the operation was discontinued. The vessel contained approximately 3 parts of the silica hydrogel and 8 parts of anhydrous ethanol.

The slurry of silica hydrogel and anhydrous ethanol from the paragraph above was charged to a sealed pressure-resistant vessel fitted with a pressure relief valve that was set to open at a pressure of 7.9 megapascals (approximately 79 atmospheres). The reaction vessel was heated to 340°C. which generated a pressure of 7.9 megapascals, these conditions of temperature and pressure being above the critical point of ethanol. The temperature was maintained at 340°C. and the ethanol was vented from the reactor at a controlled rate by operation of the pressure relief valve. After all the ethanol had been removed, heating was discontinued and rigorously anhydrous air having a dew point of less than −60°C. was gradually admitted to the reactor to bring the vessel to ambient temperature and pressure.

The silica aerogel was recovered from the reactor described in the paragraph above and was transferred to an electrically-heated calcining reactor. The silica aerogel was calcined for 4 hours at 500°C. while passing a stream of rigorously anhydrous air having a dew point of less than −60°C. through the reactor.

The surface characteristics of the silica aerogel were determined by isothermal liquid nitrogen desorption analysis. The data were obtained by the use of an Aminco Adsorptomat, Model Number 4-4680. The data were calculated and interpreted by the method described by E. V. Ballou and O. K. Dollen in Analytical Chemistry, Vol. 32, page 532, 1960. The surface area of the product was 445 square meters per gram. The pore volume of the product was 3.25 milliliters per gram. The average pore radius of the sample was 147 Angstroms, this value being calculated by multiplying the pore volume by $2 \times 10^4$ and dividing the resulting product by the surface area.

From the isothermal liquid nitrogen desorption data, FIG. 1 was reproduced to show the percent of the sample's surface area contained in particles having particular pore radii. It will be noted that the silica aerogel has a wide distribution of pore sizes with no particles of a particular pore radius containing more than about 5 volume % of the total surface area of the product.

EXAMPLE 2

Figure 2:
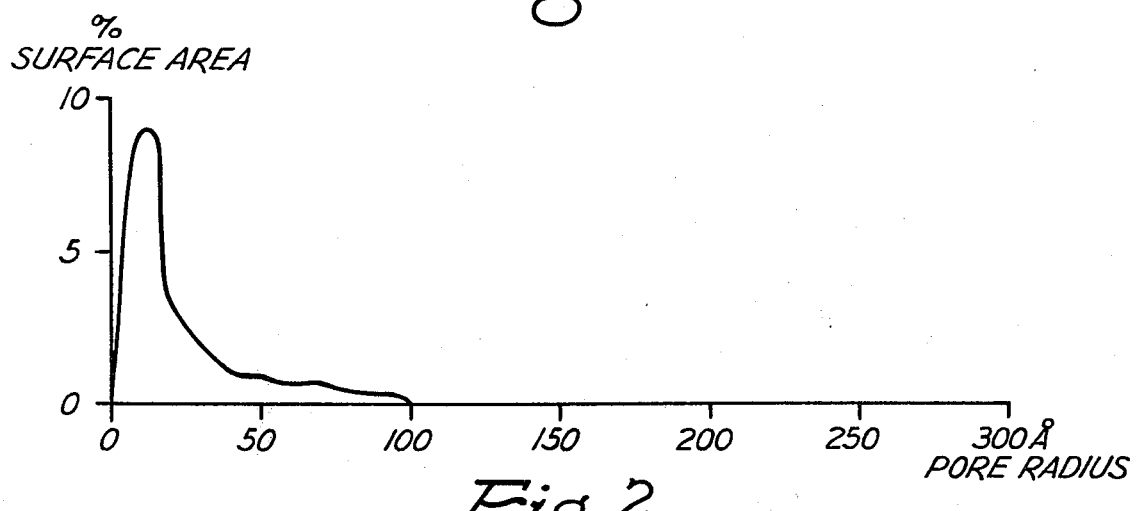
FIG. 2 of the drawings is a plot of % Surface Area vs. Pore Radius of a silica aerogel prepared in accordance with the prior art teachings.

Example 1 was repeated in all respects except that the slurry of the silica hydrogel and ethanol was removed from the reactor when the water content of the ethanol had been reduced to 4,000 ppm. The structure of the aerogel produced was studied by isothermal liquid nitrogen desorption analysis employing the same apparatus and methods described in Example 1. The surface area of the silica aerogel was 392 square meters per gram. The pore volume was 1.25 milliliter per gram. The average pore radius was 65 Angstroms. FIG. 2 is a plot of the liquid nitrogen desorption data presented on the same basis employed in FIG. 1.

From the isothermal liquid nitrogen desorption data, including the plots of FIGS. 1 and 2, several differences are noted in the structure of the two experimentally-prepared silica aerogels:

1. The silica aerogel of Example 1 has a somewhat larger total surface area, i.e., 445 square meters per gram as compared to 392 square meters per gram.
2. The silica aerogel of Example 1 has a much larger pore volume, i.e., 3.25 milliliters per gram as compared to 1.25 milliliter per gram.
3. The silica aerogel of Example 1 has a wide distribution of pore radii, with no fraction of a particular pore radius representing more than about 5 volume % of the total surface area. The bulk of the surface area is constituted of pores having relatively large radii, the average pore radius being 147 Angstroms.
4. The silica aerogel of Example 2 has a narrow distribution of pore radii, with the fraction having a pore radius of about 20 Angstroms representing about 10 volume % of the total surface area. The bulk of the surface area is constituted of pores having relatively small radii, the average pore radius being 65 Angstroms.

In a further study of the differences in the silica aerogels of Examples 1 and 2, transmission electron micrographs were obtained on the aerogels. Aliquots of the silica hydrogels in ethanol as prepared in Examples 1 and 2 were taken and transmission electron micrographs were prepared from these specimens. Comparison of the transmission electron micrographs established the following:

1. The micrographs of the two silica hydrogels were identical.
2. The micrographs of the silica hydrogel of Example 1 and the silica aerogel of Example 1 were identical. These data establish that the structure of the silica was not changed by removal of ethanol from the silica hydrogel, when the ethanol associated with the hydrogel contained 150 ppm water.
3. The micrographs of the silica hydrogel and the silica aerogel prepared in Example 2 were quite different from one another. These data establish that the structure of the silica is altered significantly by the removal of ethanol from the silica hydrogel, when the ethanol associated with the hydrogel contained 4,000 ppm water.

EXAMPLE 3

A silica aerogel was prepared by the procedure described in Example 1, with the exception that tetrahydrofuran was used in lieu of ethanol to displace the water of the silica hydrogel. The tetrahydrofuran was removed from the silica hydrogel above its critical point by operating at a temperature of 340°C. and a pressure of 6.6 megapascals (about 66 atmospheres).

Isothermal liquid nitrogen desorption analysis showed that the silica aerogel had a surface area of 395 square meters per gram, a pore volume of 3.25 milliliters per gram, and an average pore radius of 165 Angstroms. These figures are very similar to the figures obtained with the silica aerogel prepared in Example 1. The similarity of surface structure of the two silica aerogels indicates that the particular organic solvent employed in the manufacture of the silica aerogel is not critical, provided that its water content is reduced to 200 ppm or less and the organic solvent is removed from the silica hydrogel above its critical point.

Figure 3:
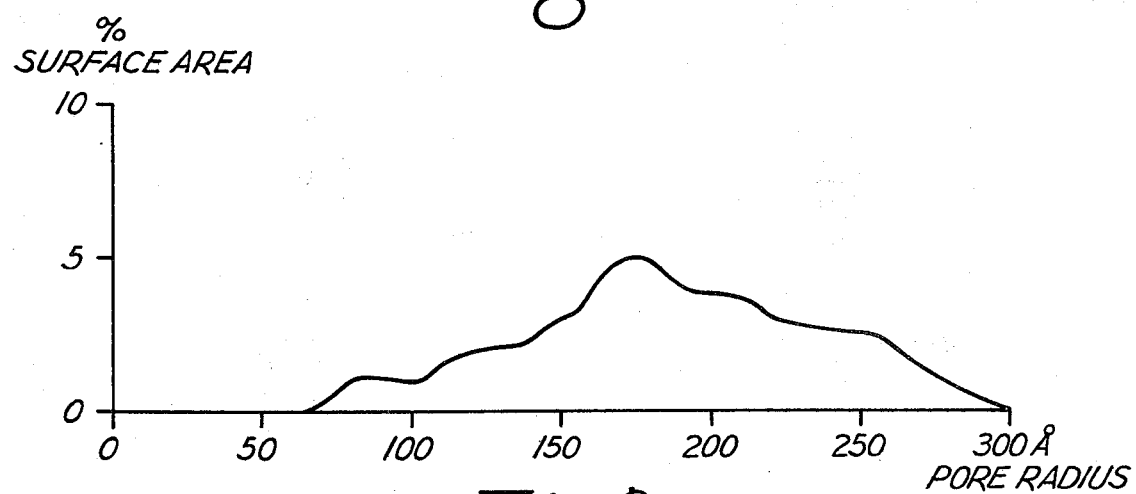
FIG. 3 of the drawings is a plot of % Surface Area vs. Pore Radius of a second silica aerogel prepared in accordance with the present invention.

FIG. 3 represents a plot of the isothermal liquid nitrogen desorption data on the same basis employed with FIG. 1. A comparison of FIG. 3 with FIG. 1 again shows that the two silica aerogels have very similar surface characteristics. The similarity of the two curves indicates that the particular organic solvent employed in the manufacture of the silica aerogel is not critical.

EXAMPLES 4 and 5

Two additional silica aerogels were prepared by the procedure of Example 1, except that the organic solvent employed to displace the water of the silica hydrogel was, respectively, ethyl acetate and methanol. The silica aerogel prepared with ethyl acetate had a surface area of 400 square meters per gram, a pore radius of 2.5 milliliters per gram, and an average pore radius of 122 Angstroms. The silica aerogel prepared with methanol had a surface area of 375 square meters per gram, a pore volume of about 2 milliliters per gram, and an average pore radius of 110 Angstroms.

The silica aerogels prepared in accordance with this invention have unique performance characteristics when employed as supports for chromium catalysts employed to polymerize ethylene in the so-called Particle Form Process. The following examples are set forth to illustrate these characteristics of the silica aerogels of the invention.

EXAMPLE 6

Part A

A 1-liter round bottom flask was charged with 2 parts of chromium trioxide and 98 parts of the silica aerogel prepared in Example 1. The charged round bottom flask then was attached to a Buchi Rotovapor. The pressure within the Rotovapor apparatus was reduced to 12 kilopascals (approximately 0.12 atmosphere) and the temperature was raised to 70°C. and maintained at this temperature for 1 hour. The temperature then was raised to 120°C. At the end of the second hour, the pressure was lowered to 8 kilopascals (approximately 0.08 atmosphere) and the temperature was increased to 170°C. At the end of the third hour, the temperature was increased to 180°C. At the end of the fourth hour, the pressure was reduced to 0.4 kilopascals (approximately 0.004 atmosphere) and the temperature was raised to 205°C. Heating was continued for an additional 3 hours under these conditions. The catalyst then was cooled to ambient temperature and rigorously anhydrous air was bled into the Rotovapor to bring the pressure back to atmospheric pressure.

The orange-brown product then was transferred to a fluidized bed apparatus for activation. The catalyst was activated by being heated to 870°C. for a period of 4 hours while maintaining the catalyst in a fluidized condition by the passage of air through the fluidized bed. The air used for this purpose had been rigorously dried so that it had a dew point of less than −50°C.

The surface characteristics of the chromium oxide impregnated silica aerogel support were determined by isothermal liquid nitrogen desorption analysis. The results were substantially identical to those obtained with the silica aerogel and set forth in Example 1. Thus, impregnation and activation of the silica aerogel with the chromium oxide did not alter the surface characteristics of the silica aerogel.

Part B

A stirred polymerization reaction vessel was charged with 0.1 part of the activated catalyst prepared in Part A. A small quantity of dry, oxygen-free isobutane was charged to the reactor, allowed to vaporize, and vented from the reactor to remove oxygen from the reactor. The reactor then was charged with 500 parts of isobutane and the system was brought to a pressure of 3.8 megapascals (approximately 38 atmospheres) with polymerization grade ethylene. The temperature was increased to 109°C. and the polymerization was initiated within 15 minutes as evidenced by a drop in pressure within the reactor. The polymerization was continued for two hours and additional quantities of ethylene were charged to the reactor as required to maintain the pressure at 3.8 kilopascals. At the end of this period, the reactor was vented and 425 parts of polyethylene were recovered. The productivity of the catalyst was 2,200 parts of polymer per part of catalyst per hour. The recovered polyethylene had a melt index of 5.2 as determined by ASTM 1238-70, Condition E. The polymer had a high load melt index of 198 as determined by ASTM 1238-70, Condition F.

EXAMPLE 7

Example 6 was repeated except that the silica aerogel of Example 1, which falls within the invention, was replaced with the silica aerogel of Example 2, which falls within the prior art. The polyethylene resin produced with this catalyst had a melt index of 1.2 as determined by ASTM 1238-70, Condition E, and a high load melt index of 50 as determined by ASTM 1238-70, Condition F. The productivity of the catalyst was 1,900 parts of polymer per part of catalyst per hour.

It is apparent that the polyethylene resin produced in Example 6 — prepared with a chromium catalyst supported on a silica aerogel falling within the present invention — has a much higher melt index than does the polyethylene resin produced in Example 7 — prepared with a chromium catalyst supported on a silica aerogel falling within the prior art. The different polymerization results obtained are surprising, particularly in view of the close similarity of the processes employed to prepare the catalysts, and their silica aerogel supports. The polymerization data suggest that the surface characteristics of the two silica aerogels are quite different in important respects.

I claim:

1. A modified Kistler process for preparing a silica aerogel which consists essentially of the steps of:
   a. Preparing a silica hydrogel,
   b. Freeing the silica hydrogel from the bulk of the water associated therewith by contacting said silica hydrogel with an organic solvent that will dissolve at least 10 wt. % water,
   c. Thereafter contacting the silica hydrogel of step (b) with the same organic solvent of step (b) that has had its water content reduced to below 200 parts per million by treatment with a molecular sieves drying agent,
   d. Continuing the treatment of step (c) until the organic solvent, after reaching equilibrium with the silica hydrogel, contains less than about 200 parts per million of water,
   e. Heating the silica hydrogel-organic solvent mixture from step (d) in a pressure-resistant vessel to a pressure at least equal to the critical pressure of the organic solvent and releasing the organic solvent therefrom at said pressure, and
   f. Cooling the silica aerogel from step (e) to ambient temperature and pressure under rigorously anhydrous conditions;

the organic solvent employed in the process having a critical pressure not higher than about 100 atmospheres and a critical temperature not higher than about 300°C.

2. The process of claim 1 in which the organic solvent is ethanol.

3. The process of claim 1 in which the organic solvent is tetrahydrofuran.

* * * * *